United States Patent [19]

Ueki

[11] Patent Number: 5,228,783
[45] Date of Patent: Jul. 20, 1993

[54] STABILITY ENHANCED LINEAR MOTION GUIDE UNIT
[75] Inventor: Hiroshi Ueki, Ebina, Japan
[73] Assignee: Nippon Thompson Co., Ltd., Tokyo, Japan
[21] Appl. No.: 781,043
[22] Filed: Oct. 18, 1991
[30] Foreign Application Priority Data
Oct. 22, 1990 [JP] Japan .................. 2-110447[U]
[51] Int. Cl.⁵ .............................. F16C 29/06
[52] U.S. Cl. .......................... 384/44; 384/45
[58] Field of Search ............... 384/44, 45, 43; 464/168

[56] References Cited
U.S. PATENT DOCUMENTS
4,902,143  2/1990  Morita .......................... 384/45
4,988,215  1/1991  Osawa .......................... 384/44
5,005,987  4/1991  Morita .......................... 384/45

Primary Examiner—Lenard A. Footland
Attorney, Agent, or Firm—Skjerven, Morrill, MacPherson, Franklin & Friel

[57] ABSTRACT

A linear motion guide unit generally includes a rail, a slider, a plurality of rollers provided in a roller guide channel defined between the rail and the slider and a plurality of balls provided in a ball guide channel defined between the rail and the slider. The roller guide channel is defined between an inner inclined guide surface formed at a shoulder of the rail and an outer inclined guide surface formed in the slider and the ball guide channel is defined between an inner guide groove having a Gothic arch-shaped cross section and an outer guide groove having also a Gothic arch-shaped cross section.

7 Claims, 3 Drawing Sheets

STABILITY ENHANCED LINEAR MOTION GUIDE UNIT

BACKGROUND OF THE INVENTION

1. Field of the Invention

This invention generally relates to a linear motion rolling contact guide unit, and, in particular, to a stability enhanced linear motion guide unit particular suitable for use as a linear motion guide unit of various machining tools and measuring devices.

2. Description of the Prior Art

A linear motion rolling contact guide unit is well known in the art and it generally includes a rail, a slider and a plurality of rolling members interposed between the rail and the slider. Such a linear motion guide unit is typically used in various machines and equipment, such as machining tools and measuring devices, for guiding a linear motion at high accuracy. FIG. 5 illustrates a typical prior art linear motion guide assembly including such a linear motion guide unit. As shown, the linear motion guide assembly includes a pair of rails 1 and 2 which extend straight and in parallel, two pairs of linear motion guide units, each pair including front and rear linear motion guide units 3 and 4, and a sliding table 5 which is fixedly mounted on the two pairs of linear motion guide units for supporting thereon any moving parts of machining tools or measuring devices.

As illustrated in FIG. 6, each of the linear motion guide units 3 and 4 has a basic structure which includes a rail A, which corresponds to rail 1 or 2 in FIG. 5, a slider B, which is generally U-shaped and thus is slidably mounted on the rail in a straddling fashion, and a plurality of rolling members C, or balls in the illustrated example. In the structure illustrated in FIG. 6, the rail A is generally rectangular in cross section and thus has a pair of opposite side surfaces, each of which is formed with an inner guide groove extending in parallel with the longitudinal axis of the rail A. In addition, the slider B is formed with a pair of endless circulating paths, each including a load path section, a return path section and a pair of curved connecting path sections connecting the corresponding ends of the load and return path sections, and the rolling members C are provided in the endless circulating paths to roll therealong endlessly. Each of the load path sections defines an outer guide groove located opposite to the corresponding inner guide groove of the rail.

In the structure shown in FIG. 6, balls are used as the rolling members C and each of the inner and outer guide grooves has a Gothic arch-shaped cross section so as to have an increased stability due to preloading and reliable and secure bearing of a load in all directions. On the other hand, use may be made of rollers as the rolling members C so as to obtain an increased stability against repetitively fluctuating loads and a prolonged servicelife.

In reality, various kinds of loads are applied to the sliding table 5 and thus to each of the sliders B in various directions, the linear motion rolling contact bearing assembly shown in FIG. 6 would not provide sufficient stability since only balls are used as rolling members C. It is thus conceivable to use both of balls and rollers as rolling members to obtain an increased stability in operation; however, a mere replacement of balls with rollers in one of the pair of endless circulating paths would not be enough because the characteristics differ between the endless circulating path including balls and the endless circulating path including rollers.

SUMMARY OF THE INVENTION

In accordance with the present invention, there is provided a linear motion guide unit which generally includes a rail, a slider, a first guide channel defined between a first shoulder at a top end of a first side wall of the rail and a first corner of the slider, a second guide channel defined between a second side wall opposite to the first side wall and an opposite side wall of the slider, a plurality of rollers provided in the first guide channel and a plurality of balls provided in the second guide channel.

Preferably, the slider includes a pair of first and second endless circulating paths, each of which includes a load path section, a return path section and a pair of curved connecting path sections connecting the corresponding ends of the load and return path sections. In this preferred embodiment, the load path section of the first endless circulating path defines a first outer guide groove which in turn defines a part of the first guide channel. The remaining portion of the first guide channel is defined by a first inner guide surface defined at the first shoulder between the top surface and the first side surface of the rail. Similarly, the load path section of the second endless circulating path defines a second outer guide groove which in turn defines a part of the second guide channel. The remaining portion of the second guide channel is defined by a second inner guide groove defined in the second side surface of the rail. Preferably, each of the second inner and outer guide grooves has a generally Gothic arch-shaped cross section.

In a preferred application where two of the present linear motion guide units are provided as spaced apart from each other in parallel, the guide units are arranged such that they are symmetrical in structure with respect to a center line between the two guide units.

Because of the provision of rollers as rolling members in roller guide channel defined at a first predetermined location between the rail and the slider, an enhanced dynamic resistance against a repetitively fluctuating load is obtained, and, furthermore, since balls are provided in a ball guide channel defined at a second predetermined location between the rail and the slider, there can be obtained an enhanced stability, in particular an increased vibration absorbing ability due to preloading and an increased ability to bear various loads in all directions.

It is therefore a primary object of the present invention to provide an improved linear motion guide unit high in stability in performance.

Another object of the present invention is to provide an improved linear motion guide unit capable of utilizing both of the characteristics provided by balls and roller as rolling members.

A further object of the present invention is to provide an improved linear motion guide unit relatively simple in structure and compact in size and low at cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
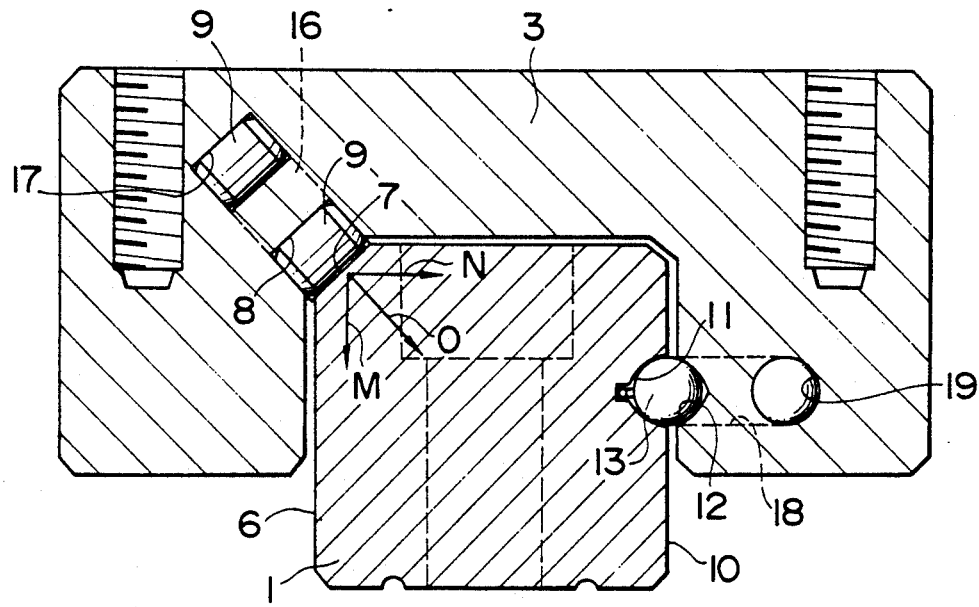
FIG. 1 is a schematic illustration showing in transverse cross section a linear motion guide unit constructed in accordance with one embodiment of the present invention.

Referring now to FIG. 1, there is schematically shown in transverse cross section a linear motion guide unit constructed in accordance with one embodiment of the present invention. As shown, the present guide unit generally includes a rail 1, a slider 3 and a plurality of rolling members 9 and 13 interposed between the rail 1 and the slider 3. In the illustrated embodiment, the rail 1 is elongated and extends straight over a desired length along its longitudinal axis and it has a generally rectangular cross section, though it may also has any other cross sectional shape. In the illustrated embodiment, since the rail 1 is generally rectangular in shape, it has a top surface, a bottom surface and a pair of first and second side surfaces or walls 6 and 10, respectively.

A first inner guide groove 7 is defined as an inclined surface at a first shoulder between the top surface and the first side surface 6 extending in parallel with the longitudinal axis of the rail 1. The angle of the inclined first inner guide surface 7 may be determined at any desired value depending on applications. As will become clear later, the first inner guide surface 7 defines a part of a first or roller guide channel between the rail 1 and the slider 3. A second inner guide groove 11 is formed in the second side surface 10 of the rail between the top and bottom surfaces of the rail 1. In the illustrated embodiment, the second inner guide groove 11 is located approximately at a center between the top and bottom surfaces, though the present invention should not be limited only to this location. The second inner guide groove 11 defines a part of a second or ball guide channel as will become clear later. The second inner guide groove 11 also extends straight in parallel with the longitudinal axis of the rail 1.

The slider 3 has a generally inverted-U-shaped cross section and thus it generally includes a horizontal section and a pair of vertical sections extending downward from the opposite sides of the horizonal section. The slider is provided with a pair of first and second endless circulating paths, each of which includes a load path section, a return path section and a pair of curved connecting path sections connecting the corresponding ends of the load and return path sections as well known in the art. In the illustrated embodiment, the first endless circulating path defines a roller endless circulating path which includes a load path section 8, a return path section 17 and a pair of curved connecting path sections 16 connecting the corresponding ends of the load and return path sections 8 and 17. On the other hand, the second endless circulating path defines a ball endless circulating path which includes a load path section 12, a return path section 19 and a pair of curved connecting path sections 18 connecting the corresponding ends of the load and return path sections 12 and 19.

A plurality of rollers 9 are provided in the first or roller endless circulating path, and a plurality of balls 13 are provided in the second or ball endless circulating path. The load path section 8 of the first or roller endless circulating path is defined as an inclined first outer guide surface facing opposite to the first inner guide surface 7 of the rail 1. The first outer guide surface 8 is defined as an inclined and flat bottom surface of a generally rectangular groove formed at an inside corner of a joint between the horizontal section and the left-hand vertical section. Thus, a roller guide channel is defined between the pair of first inner and outer guide surfaces 7 and 8, which are substantially flat, and the rollers 9 located in this roller guide channel provide a rolling contact between the rail 1 and the slider 3.

Figure 2:
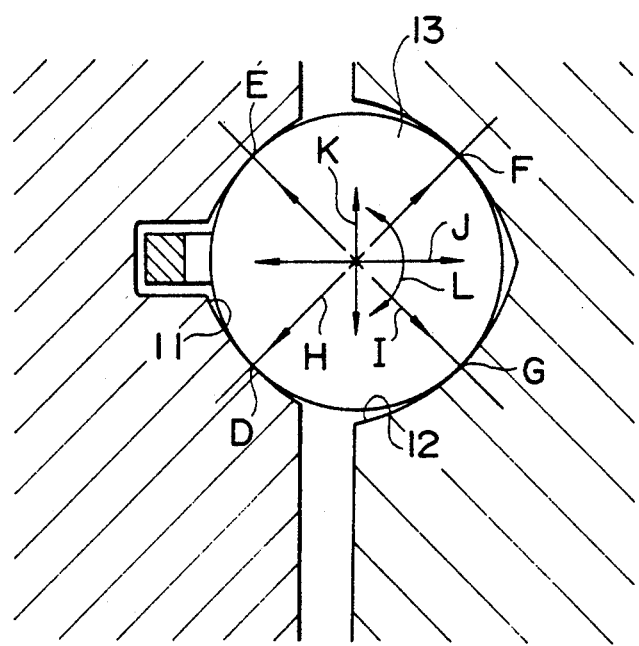
FIG. 2 is a schematic illustration showing on an enlarged scale the ball guide channel in the guide unit of FIG. 1.

On the other hand, the load path section 12 of the second or ball endless circulating path defines a second outer guide groove which is located opposite to and extending in parallel with the associated second inner guide groove 11 of the rail 1, so that a second or ball guide channel is defined by a pair of second inner and outer guide grooves 11 and 12. The second outer guide groove 12 in the illustrated embodiment also has a generally Gothic arch-shaped cross section. The rolling contact condition between the ball guide channel and the balls 13 is best shown on an enlarged scale in FIG. 2. As shown, each of the balls 13, when located in the ball guide channel, makes two point contacts with the second inner guide channel 11 at points E and D and also two point contacts with the second outer guide channel 12 at points F and G. Accordingly, through this ball rolling contact structure, any load directed in any direction, such as H, I, J and K indicated by the double arrows, can be effectively supported. In addition, this ball rolling contact structure can also support a moment load as indicated by the double arrow L. On the other hand, the roller rolling contact structure is mainly responsible for supporting a repetitively fluctuating load having a direction over the angle between N and M indicated in FIG. 1.

Figure 5:
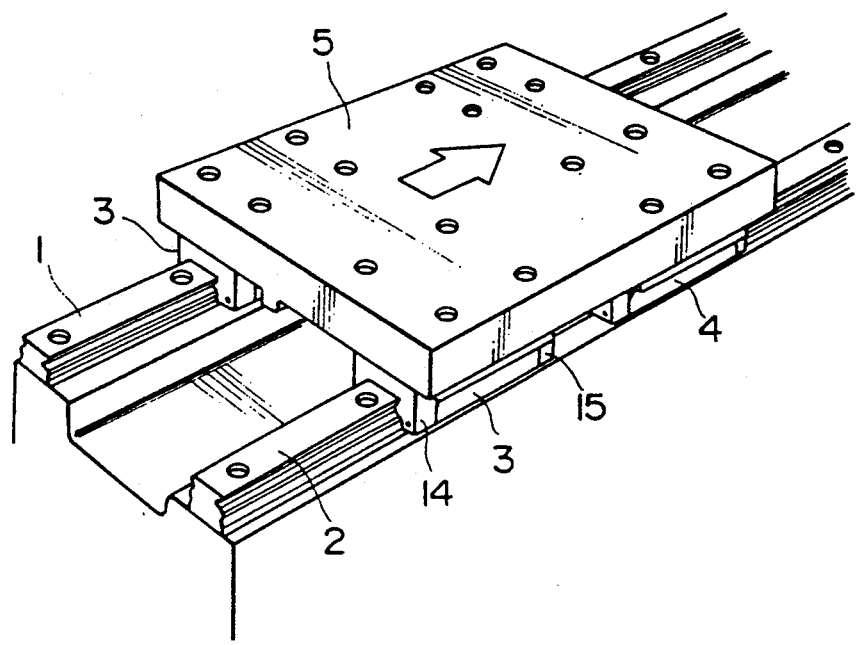
FIG. 5 is a schematic illustration showing in perspective view a prior art linear motion guide unit assembly.
Figure 6:
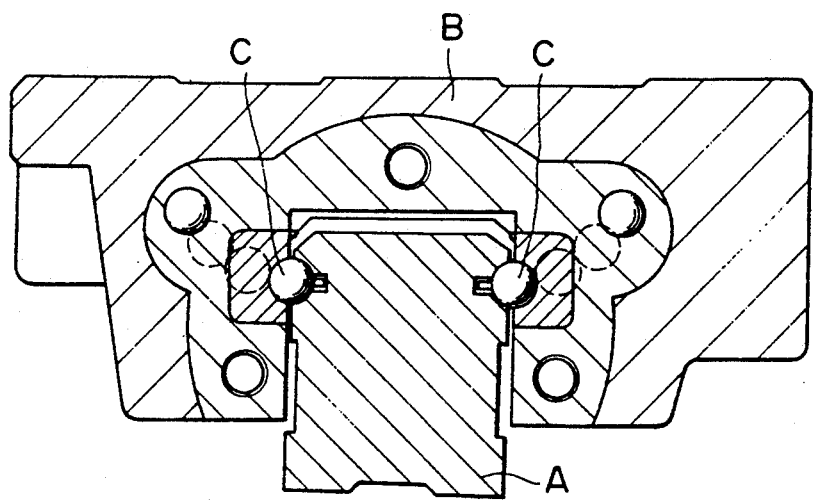
FIG. 6 is a schematic illustration showing in cross section a typical prior art linear motion rolling contact guide unit used in the assembly in FIG. 5.

It is to be noted that as well known in the art the slider 3 is typically comprised of three blocks, i.e., a center block and a pair of front and rear end blocks 14 and 15 as shown in FIG. 5. Such a three-part structure is advantageous particularly from a manufacturing viewpoint for the slider 3 having an endless circulating path because each of the curved connecting path section can be manufactured in each of the front and rear end blocks. If the slider 3 does not have an endless circulating path, then the slider 3 may have a one-part structure.

Figure 3:
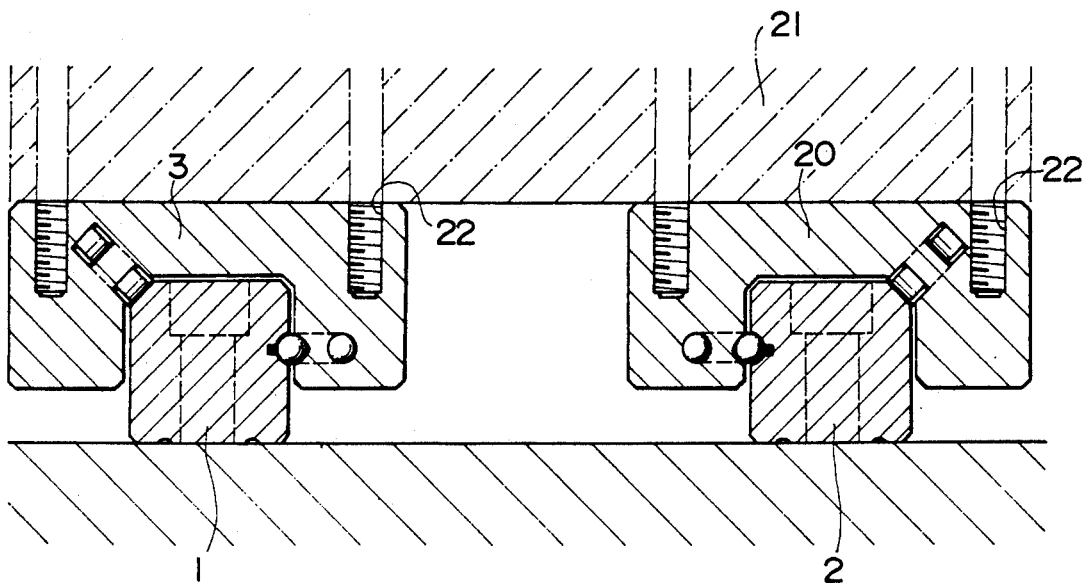
FIG. 3 is a schematic illustration showing in cross section a linear motion guide assembly constructed by incorporating two of the present linear motion guide unit in one symmetrical arrangement.

FIG. 3 illustrates a linear motion guide assembly constructed by using two of the present linear motion guide units. As shown, a pair of rails 1 and 2 similar in structure are mounted on a base spaced apart from each other and in parallel. The slider 3 is slidably mounted on the rail 3 and a slider 20 similar in structure is also slidably mounted on the rail 2. A sliding table 21 is mounted commonly on the sliders 3 and 20 and fixedly attached thereto by screwing bolts into their threaded holes 22. What is important in the guide assembly shown in FIG.

3 resides in a symmetrical arrangement of the pair of linear motion guide units with respect to a center line therebetween. In other words, in the arrangement shown in FIG. 3, the first or roller guide channel of each of the left and right guide units is located outside and the second or ball guide channel of each of the left and right guide units is located inside and facing each other.

Figure 4:
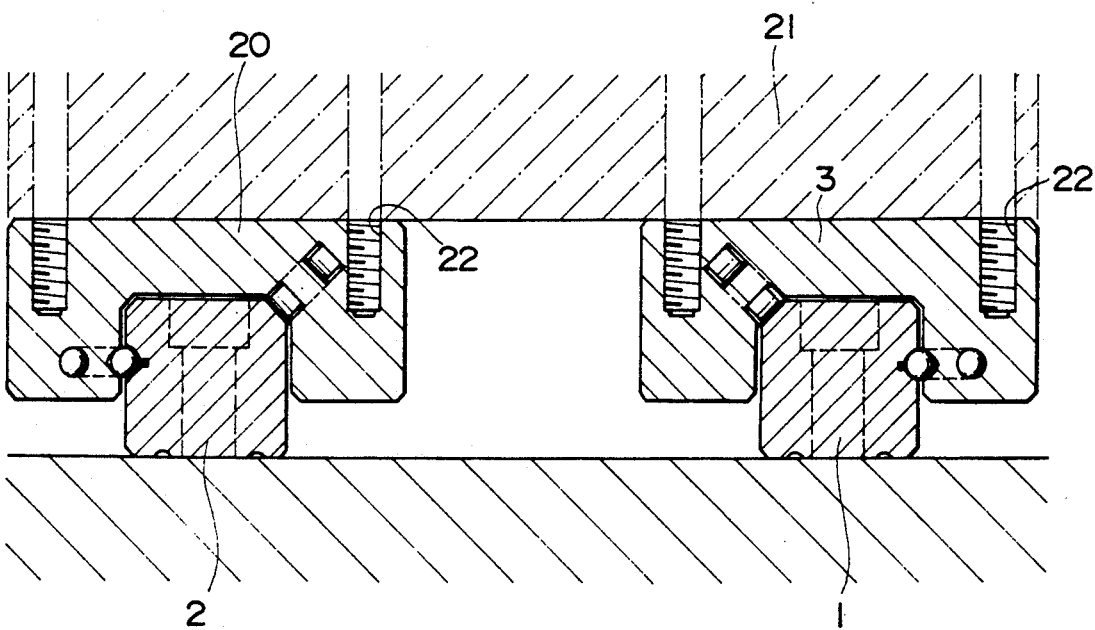
FIG. 4 is a schematic illustration showing in cross section a linear motion guide assembly constructed by incorporating two of the present linear motion guide unit in another symmetrical arrangement.

FIG. 4 illustrates another arrangement of a linear motion guide assembly constructed by using two of the present linear motion guide units. The structure shown in FIG. 4 is basically the same as that shown in FIG. 3 except the fact that the left and right guide units of FIG. 3 are switched to right and left guide units in FIG. 4. Thus, the overall structure shown in FIG. 4 also maintains symmetrical with respect to the center line of the assembly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion guide unit, comprising:
an elongated rail extending over a desired length and having a top surface and a pair of first and second side surfaces which are opposite to each other;
a first inner guide means provided at a first shoulder between said top surface and said first side surface of said rail, a second shoulder between said top surface and said second side surface being free of any guide means, said first inner guide means extending in parallel with a longitudinal axis of said rail;
a second inner guide means provided in said second side surface of said rail at a location below said top surface, said first side surface below said first shoulder being free of any guide means, said second inner guide means extending in parallel with said longitudinal axis of said rail;
a slider having a horizontal section and a pair of vertical sections extending downward from opposite sides of said horizontal section;
a first outer guide means provided in said slider and located opposite to and extending in parallel with said first inner guide means, thereby defining a first guide channel between said first inner and outer guide means;
a second outer guide means provided in said slider and located opposite to and extending in parallel with said second inner guide means, thereby defining a second guide channel between said second inner and outer guide means;
a plurality of rollers provided in said first guide channel; and
a plurality of balls provided in said second guide channel.

2. The guide unit of claim 1, wherein said first inner guide means includes an inner inclined guide surface defined at said shoulder between said top and first side surfaces of said rail and said first outer guide means includes an outer inclined guide surface located opposite to and spaced away from said inner inclined guide surface.

3. The guide unit of claim 1, wherein said second inner guide means includes an inner guide groove having a generally Gothic arch-shaped cross section and said second outer guide means includes an outer guide groove having a generally Gothic arch-shaped cross section.

4. The guide unit of claim 1, wherein said slider includes a pair of first and second endless circulating paths, each including a load path section, a return path section and a pair of curved connecting path sections connecting corresponding ends of said load and return path sections, and wherein said load path section of said first endless circulating path defines said first outer guide means and said load path section of said second endless circulating path defines said second outer guide means.

5. A linear motion guide assembly including a pair of said linear motion guide units as defined in claim 1 including a second elongated rail and a second slider, each of said guide units mounted on a respective rail, and a sliding table which is commonly mounted on said sliders of said pair of linear motion guide units, wherein said rails of said pair of linear motion guide units are arranged to extend in parallel and said pair of linear motion guide units are arranged symmetrically in structure with respect to a center line between said pair of linear motion guide units.

6. The assembly of claim 5 wherein said first inner guide means are provided only at an outer shoulder of each of said pair of rails.

7. The assembly of claim 5 wherein said first inner guide means are provided only at an inner shoulder of each of said pair of rails.

* * * * *